United States Patent [19]

Kawazoe et al.

[11] Patent Number: 4,908,541
[45] Date of Patent: Mar. 13, 1990

[54] AIR-COOLED LAYERED COIL VEHICLE AC GENERATOR STATOR

[75] Inventors: Takashi Kawazoe, Kiryu; Shigeru Akutsu, Gumma; Nobuhisa Hongo, Kiryu, all of Japan

[73] Assignee: Mitsuba Electric Mfg., Co., Ltd., Gumma, Japan

[21] Appl. No.: 88,958

[22] Filed: Aug. 24, 1987

[30] Foreign Application Priority Data

Aug. 28, 1986 [JP] Japan .................. 61-202338
Sep. 8, 1986 [JP] Japan .................. 61-211212

[51] Int. Cl.⁴ .................. H02K 3/04; H02K 3/24
[52] U.S. Cl. .................. 310/270; 310/63; 310/208
[58] Field of Search .............. 310/194, 208, 261, 270, 310/42, 62, 63, 260, 58, 61, 65

[56] References Cited

U.S. PATENT DOCUMENTS

| | | | |
|---|---|---|---|
| 1,751,424 | 3/1930 | Rosenthal | 310/58 |
| 3,184,625 | 5/1965 | Farison | 310/59 |
| 3,226,581 | 12/1965 | Brewster | 310/59 |
| 3,271,606 | 9/1966 | Collins | 310/263 |
| 3,305,740 | 2/1967 | Shano | 310/42 |
| 3,361,915 | 1/1968 | Baker | 310/68 |
| 3,422,339 | 1/1969 | Baker | 321/8 |
| 3,538,362 | 11/1970 | Cheetham | 310/68 |
| 3,714,484 | 1/1973 | Habert | 310/263 |
| 3,831,045 | 8/1974 | Anisimov | 310/52 |
| 3,846,651 | 11/1974 | Mishra | 310/61 |
| 4,028,568 | 6/1977 | Tasumi | 310/42 |
| 4,087,713 | 5/1978 | Binder | 310/266 |
| 4,406,961 | 9/1983 | Pfluger | 310/232 |
| 4,418,295 | 11/1983 | Shiga | 310/59 |
| 4,419,597 | 12/1983 | Shiga | 310/68 |
| 4,464,594 | 8/1984 | Matsumoto | 310/63 |
| 4,492,885 | 1/1985 | Kitamura | 310/62 |
| 4,500,772 | 2/1985 | Ahner | 219/209 |
| 4,549,103 | 10/1985 | Shiga | 310/60 |
| 4,554,475 | 11/1985 | Sisk | 310/61 |
| 4,617,485 | 10/1986 | Nakamura | 310/65 |
| 4,757,221 | 7/1988 | Kurihashi et al. | 310/68 D |

FOREIGN PATENT DOCUMENTS

| | | | |
|---|---|---|---|
| 1119462 | 6/1956 | France | 310/68 D |
| 58-51762 | 3/1986 | Japan | 310/68 D |

*Primary Examiner*—Patrick R. Salce
*Assistant Examiner*—D. L. Rebsch
*Attorney, Agent, or Firm*—Darby & Darby

[57] ABSTRACT

A stator coil of a generator for vehicles is provided with a stator coil construction and method for winding the stator coil around the core. The coil is wound around the stator core so that a portion of the stator coil projects from one or both sides of the stator core in the axial (longitudinal) direction of the core. The projecting portion of the stator coil closely surrounds the rotor core and is composed of inner and outer wire batches between which are formed slits which permit cooling air to pass therethrough and cool the coil more efficiently. The cooling air is generated by a fan which is attached to the rotor core facing the inner surface of the projecting portion of the stator coil.

11 Claims, 11 Drawing Sheets

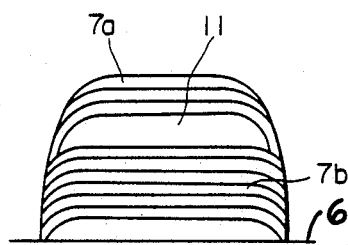
FIG.3
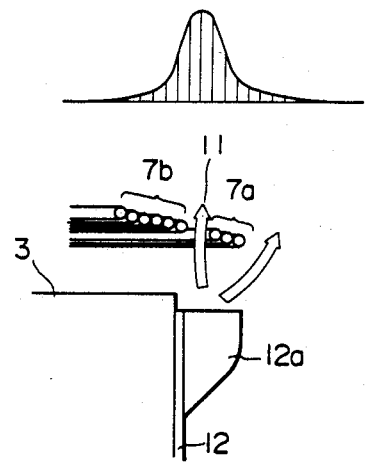
FIG. 5(B)
FIG.5(A)

(A)

(B)

(A)

(B)

(A)

(B)

AIR-COOLED LAYERED COIL VEHICLE AC GENERATOR STATOR

BACKGROUND OF THE INVENTION

The invention is related to the stator coil of a generator used in such vehicles as automobiles, buses, trucks, and motorcycles.

Recently, the capacity of ac generators has become larger because of an increasing electric consumption in vehicles by an increasing number of electric and electronic equipment, used therein. At the same time, the generators are required to be even smaller to fit into the limited space provided for them. In order to provide such a high output small generator which meets the above requirements, it is necessary to improve the cooling characteristics of the generator, especially the cooling characteristics of the stator coil, because a substantial part of the heat generated during the operation of a generator is created by the stator coil.

In a conventional alternating current generator commonly used in vehicles, bundles of twined wire of the stator coil project from one or both sides of the stator core in the longitudinal direction. The projecting portion of the stator coil is cooled by cooling air generated by a fan that rotates with the rotor core. However, the problem in the conventional generator is that the smaller stator core wound in such a manner is not cooled effectively enough to permit a more compact and higher output generator.

In another conventional generator, the projecting portion of the stator coil is arranged so that the wires are spread approximately in a cylindrical form surrounding the rotor core in order to increase the surface of the projecting portion that may be exposed to the cooling air. However, this arrangement of the coil also fails to provide the above-mentioned cooling characteristics because the projecting portion of the stator coil interferes with the smooth and effective flow of cooling air. Therefore, this arrangement can worsen the cooling characteristics of the generator.

An object of the present invention, in view of the insufficient cooling characteristics of conventional generators, is to provide a generator used in vehicles having a stator coil with improved cooling characteristics, thereby, enabling both a more compact and more powerful generator.

Another object of the present invention is to provide a method for winding the wire of the stator coil around the stator core.

SUMMARY OF THE INVENTION

The invention relates to a stator coil of a generator for vehicles and discloses an improved stator coil arrangement and a method for winding the stator coil.

The stator coil according to the present invention is characterized by its increased cooling characteristics which is achieved by an improved arrangement of the coil and a cooling fan attached to a rotor core. The stator coil is wound around the stator core so that a portion of the stator coil projects from the stator core in the longitudinal direction. The projecting portion of the coil, which is arranged in a slightly distant relation around the rotor core, is composed of inner and outer wire batches between which are formed slits which permit cooling air to pass therethrough and cool the coil. The cooling air is generated by a fan which is attached to the rotor core and faces the coil. Because the surface of the stator coil exposed to the cooling air and the quantity of the air flow effectively cooling the stator coil has increased by virtue of the slits formed therethrough, the stator coil is more effectively cooled according to the invention.

Though the arrangement of the stator coil on the stator core is sophisticated in a sense, the winding is accomplished easily accordingly to a method also provided by the present invention.

BRIEF DESCRIPTION OF THE DRAWINGS

FIG. 3 is an enlarged side view of a single wire bundle of a projecting portion of a stator coil seen as shown from a point outside of said stator core looking inward;

FIG. 5(A) is a perspective view of a projecting portion of the stator coil and a cooling fan with parts broken away to more clearly illustrate the details of the construction and a cooling air flow;

FIG. 5(B) is a graph showing an air flow speed distribution in the vicinity of a projecting portion of the stator coil of the present invention;

DETAILED DESCRIPTION OF THE PREFERRED EMBODIMENTS OF THE INVENTION

Figure 1:
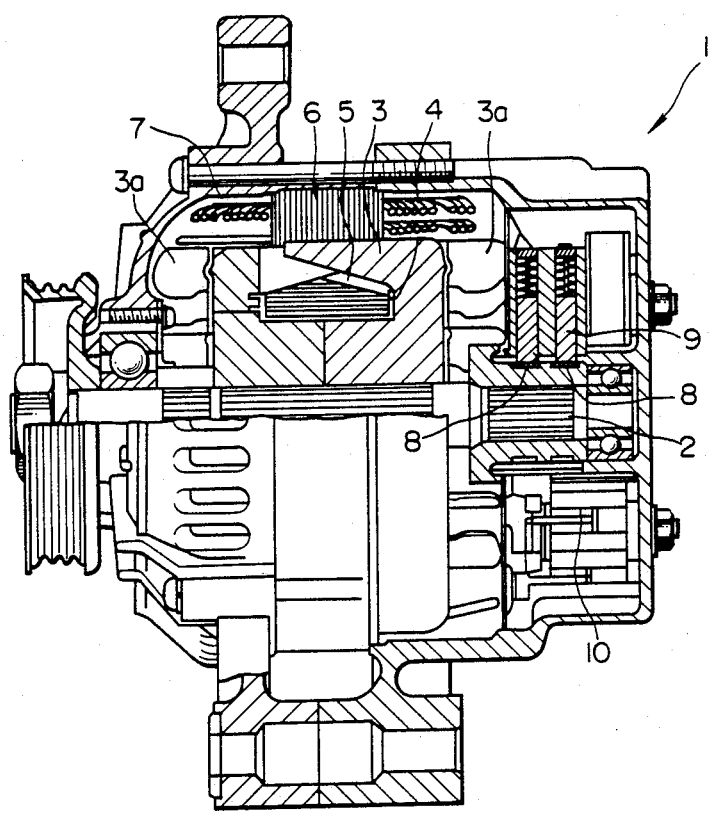
FIG. 1 is a longitudinal side view of an alternating current generator according to the present invention with parts broken away to more clearly illustrate the details of construction.

As shown in FIG. 1, an alternating current generator 1 for a vehicle comprises a core shaft 2, a rotor core 3 that is engaged with the core shaft 2, a coil bobbin 4 that is installed in the rotor core 3, a rotor coil 5 that is wound around the coil bobbin 4, a stator core 6, a stator coil 7 that is wound around the stator core 6, a slip ring 8, a brush 9 which is kept in contact with the slip ring 8, and a rectifier 10 that rectifies generated alternating current. The parts described above are common to conventional generators for vehicles.

Figure 2:
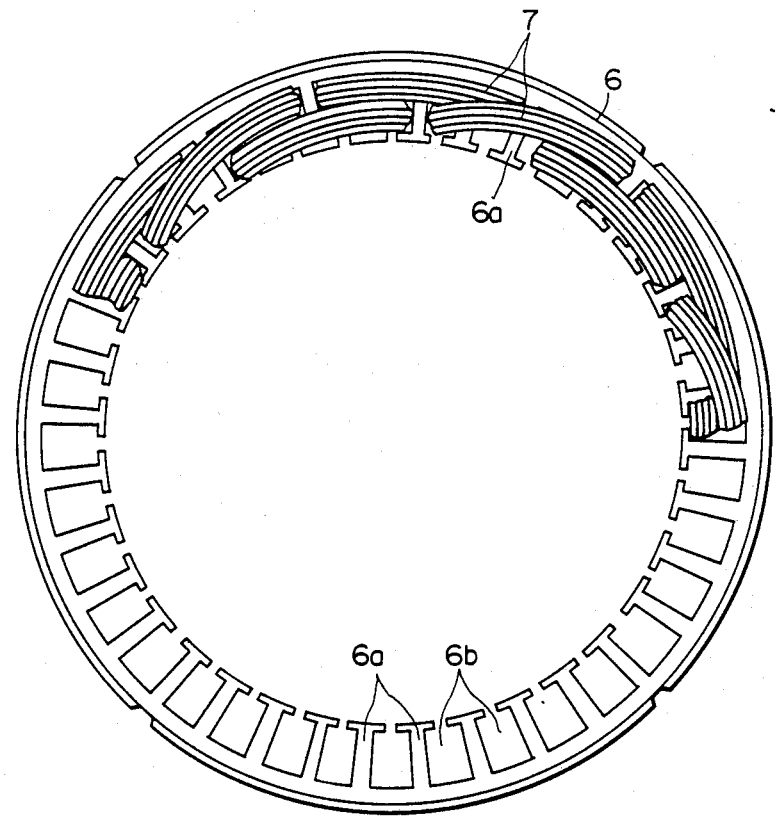
FIG. 2 is an axial side view of a stator core and a stator coil according to the present invention with portions of the stator coil broken away to more clearly illustrate the stator core.

In the preferred embodiment of the invention, referring to FIG. 2, the stator core 6 is cylindrical in form and is provided with teeth 6a which are spaced from each other along the inner surface of the stator core 6. Each of the teeth 6a runs parallel with the axis of the stator core 6 and has a T-shaped cross section with respect to a plane perpendicular to the axis of the stator core. Grooves or slots 6b are formed between the teeth 6a parallel to each other along the entire length of the stator core 6. The stator coil 7 is composed of three bundles of electrically conductive wires, wherein each bundle corresponds to one component of the three-phase-current which will be generated by the generator. The bundles are each composed of nine wires and are disposed so that each bundle meanders through every third groove 6b. More specifically, a bundle passes in a longitudinal direction within one groove 6b. It then projects in the same direction from a side of the stator core, thereafter turning around towards another groove in the stator core which is two grooves from the initial groove 6b. The shape of the loop created when the wires of the bundle turn around at this projected portion is one of two shapes depending on the wire batch. The six wire batch 7b forms a loop which is closer to the edge of the stator core than the loop formed by the three wire batch 7a. The relative eights of the six wire batch and the three wire batch with respect to the edge of the stator core is shown in FIG. 3. The protruding bundles 7 forming the loops as described are further arched around an axis which is parallel to the central stator core axis such that each bundle 7 protruding from the stator core 6 is parallel to the edge of the stator core 6 or is curved inwardly to avoid a bundle already woven, as shown in FIG. 2. Each of the three bundles are woven within the grooves 6b of the stator core 6 in the fashion described above, alternating every third groove 6b. The projecting portion of the bundle seen from an outer side of the stator core 6 is shown in FIG. 3. The bundle repeats this arrangement projecting from both sides of the stator core until the stator core is completely wound.

The bundles are out of phase from each other around the axis of the stator core by an angle $\phi$ which is equal to a sectoral angle, as measured around the longitudinal axes of the stator coil 6, between two adjacent grooves 6b around the central axis. As a result, the grooves 6b are provided, in turn, with a first bundle, then a second bundle and then a third bundle, sequentially.

In the portion projecting from a side of the stator core 6, wires composing each bundle are arranged as follows.

Each wire bundle is composed of an inner wire batch having three outer wires 7a and an outer wire batch having six inner wires 7b. The terms inner and outer are used hereinafter relative to the central core shaft 2, so that the outer batch 7b having six wires is radially further from the central core shaft 2 than the inner three wire batch 7a. The inner wires 7a are adjacent to each other in a row and project further from the edge of the stator core 6 than the outer wires 7a, the latter also being arranged in the same manner as the former ones. This wire arrangement provided a slit 11, of which the width is approximately twice the diameter of the wire, formed between the outer batch and the inner batch.

Figure 4:
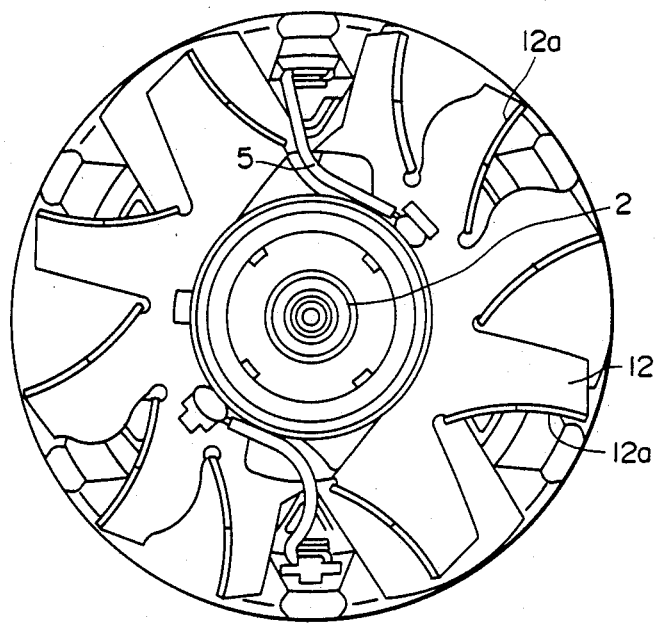
FIG. 4 is an axial side view of a cooling fan.

A pair of cooling fans 12 are disposed at both sides of the rotor core 3. As shown in FIG. 4, the cooling fan 12 has blades 12a which are formed on the outer surface of a fan body facing from inside the projecting part of the stator coil. More precisely, the cooling fans 12 are located so that the air flow generated by them passes most effectively through the slits 11 formed in the stator coil 7, as shown in FIG. 5.

According to the above-mentioned construction, alternating current is first generated due to a rotational force applied to the rotor core 3. The current is then rectified by the rectifier 10 and outputted. At the same time, the wires of the stator coil 7 are cooled by the air flow generated by the cooling fan 12.

In the present invention, because slits 11 are present between the outer and the inner wire batches which are both projecting outwardly in the axial direction from this sides of the stator core 6 and because the cooling air flows through the slits, the quantity of effective cooling air flow and the surface of the stator core to be exposed to the air flow increase. The slits 11 which are located in the same plane as the cooling fan 12 encourage the cooling air from the fan 12 to flow through the slits 11, without having to flow around the outer side of the outer wires.

As a result both the stator coil 7 and the generator body are sufficiently cooled and are thereby effectively prevented from overheating during the generator's operation. There is an increase in the cooling characteristics of the generator which permits the generation of more power while maintaining a compact generator size.

The method and the apparatus to be used for winding the coil onto the stator core 6 will now be described with reference to FIGS. 6 through 11.

Figure 6:
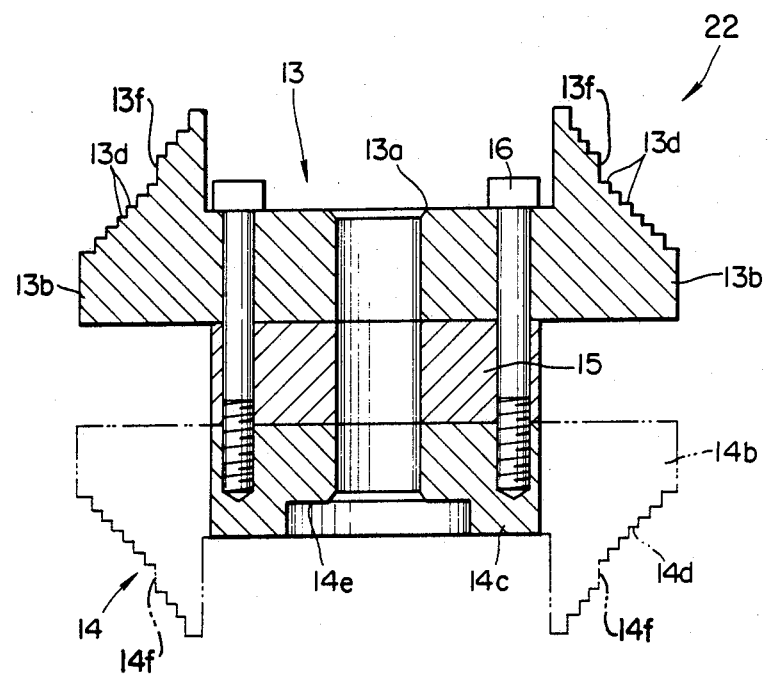
FIG. 6 is a perspective view of a bobbin for winding a stator coil therearound with parts broken away to more clearly illustrate the details of the construction.
Figure 7:
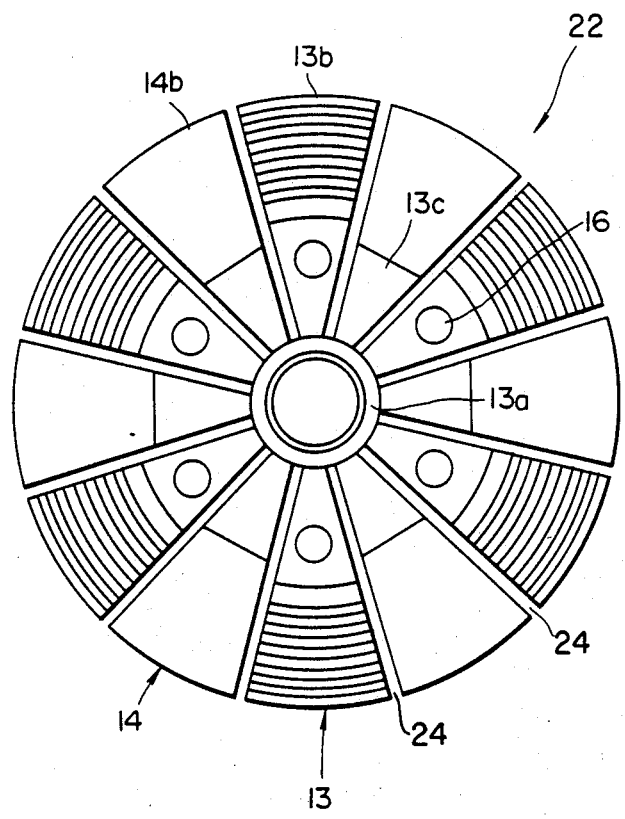
FIG. 7 is an axial side view of the bobbin.
Figure 8:
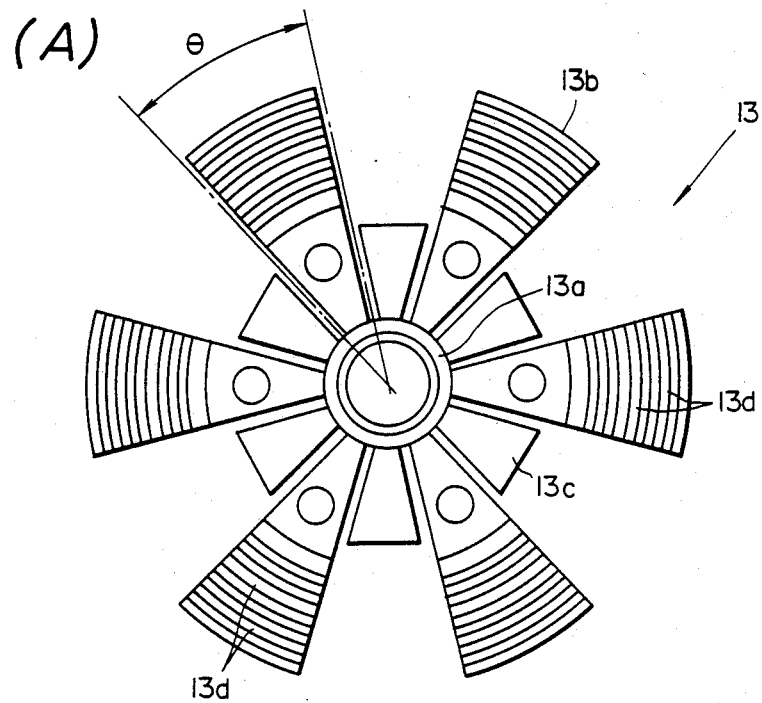
FIG. 8 is a perspective view and a sectional view of fins disposed to a bobbin.
Figure 8:
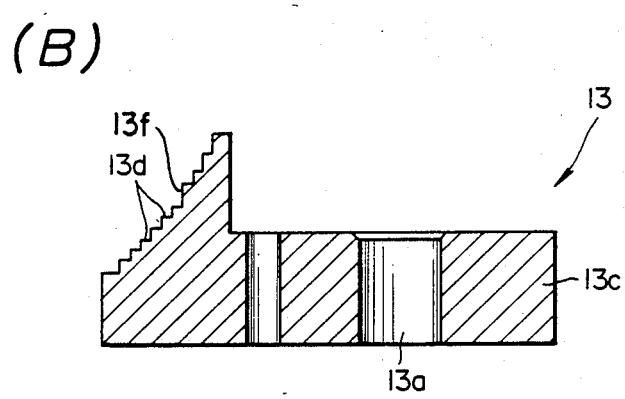

As shown in FIG. 6, the bobbin 22 comprises a spacer 15 and a pair of wheels 13d and 14 which are secured to each end of the spacer 15, respectively, so that the planes defined by the wheels 13 and 14 are perpendicular to the axis of the spacer 15. As shown in FIGS. 6, 7, and 8, wheels 13 and 14 both comprise two central portions 13a, 14a, six fins 13b, 14b extending radially outward from the central portions 13a and 14a, and six supplementary fins 13c, 14c, each being disposed between the fins 13b, 14b, respectively. The sectoral angle $\theta$ of the fins 13b, 14b is defined as the angle around the axis between two side faces of a fin 13b, 14b, and is identical with that of the supplementary fins 13c, 14c. A gap of which the width is slightly larger than the diameter of the wire to be wound around the stator core 6 is provided between each of the fins 13b, 14b and the supplementary fins 13c, 14c. The wheel 13 is positioned around the axis so that the fins 13b of the wheel 13 lie directly above the supplementary fins 14c of the wheel 14. The outer surfaces of the fins 13b are slanted so that the cross-section view, as shown in FIG. 6, of two fins 13b appear conical in shape, whereby the vertex of the cone lies on the axis of the spacer 15 and above the spacer 15. The outer surfaces of the fins 14b are shaped similarly as shown in FIG. 6 (in Phantom). Nine coaxial grooves 13d, 14d are formed, horizontally, in the slanting surface of each fin 13b, 14b, respectively, adjacent to each other. A larger space 13f, 14f is provided between the third and the fourth grooves as counted from the inner most groove and as shown in FIG. 6.

Figure 11:
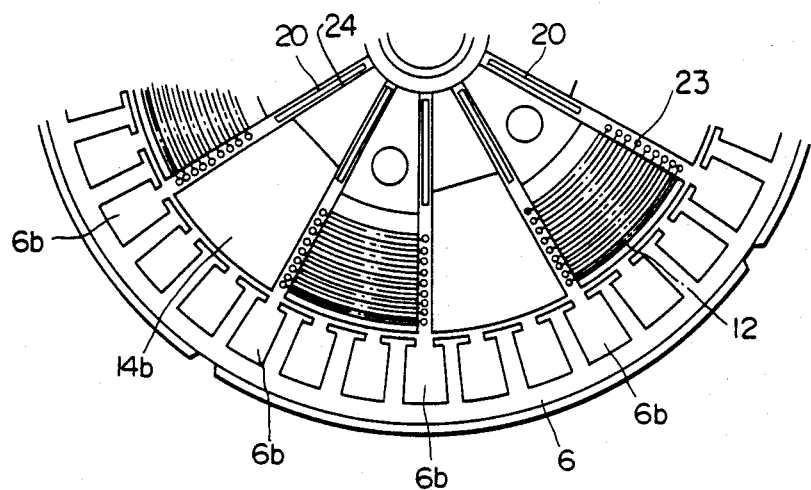
FIG. 11 is an enlarged axial side view of a bobbin and a stator coil installed in a stator core for a relocation of the stator coil to the stator core.
Figure 11:
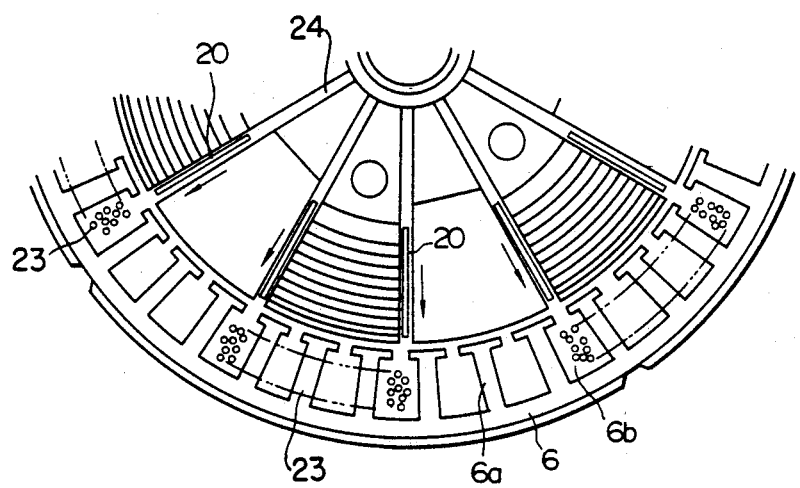

A slider 20 is disposed in each gap 24 formed between a fin 13b, 14b and a supplementary fin 13c, 14c, respectively, so that they are slidable along the gap in the radial direction as shown in FIG. 11.

The wire which is to be wound around the stator core 6 is first wound around the bobbin 22 and then relocated to the stator core 6 according to the procedure described hereinafter. In the following description, a downward direction denotes a direction along the axis of the bobbin 22 from the wheel 13 to the wheel 14; a forward direction denotes a clockwise direction around the axis as viewed from above the wheel 13; an inward direction denotes a radial direction towards the axis; upward, backward and outward directions correspond, respectively, to the direction opposing the above directions.

Figure 9:
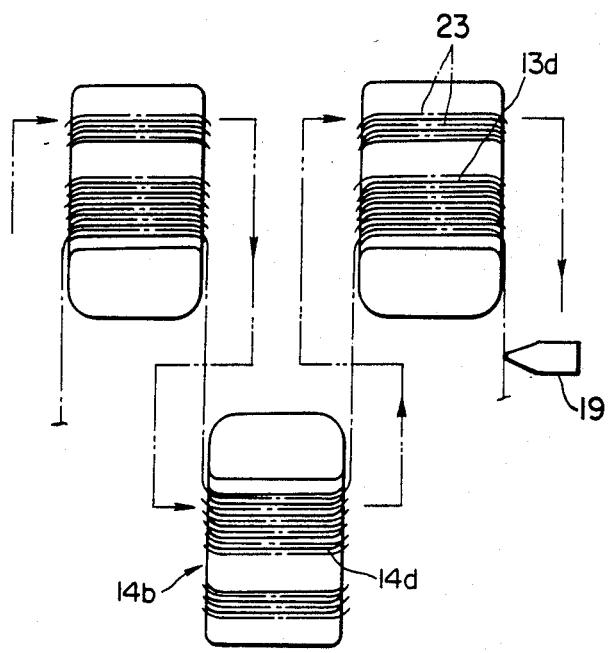
FIG. 9 is a schematic sketch of fins and a stator coil showing how the coil is wound around the fins.

The bobbin 22 is secured to a rotatable means 17 which is capable of rotating in the forward and backward directions in prescribed angles around the axis of the bobbin 22. A wire 23 is installed in a wire supplier 19 which is capable of moving in both the upward and downward directions as well as the inward and outward directions, as shown in FIG. 9.

Movement of the rotatable means 17, the wire supplier 19 and the slider 20 is controlled by a microcomputer according to the following procedure.

Figure 10:
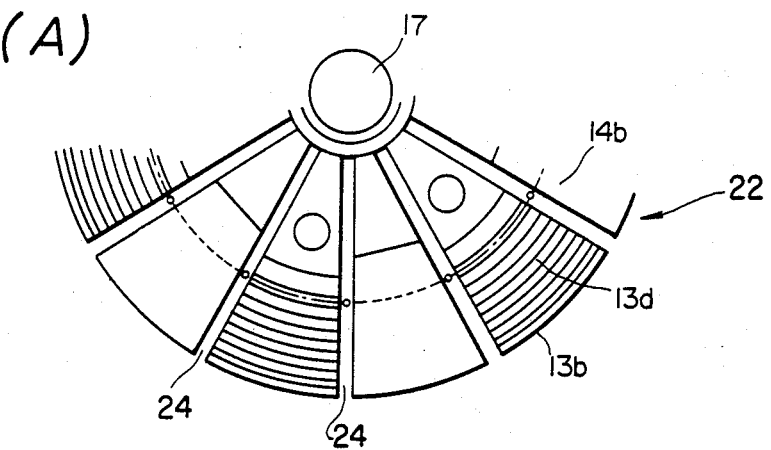
FIG. 10 is an enlarged axial side view of a bobbin and a stator coil wound therearound.
Figure 10:
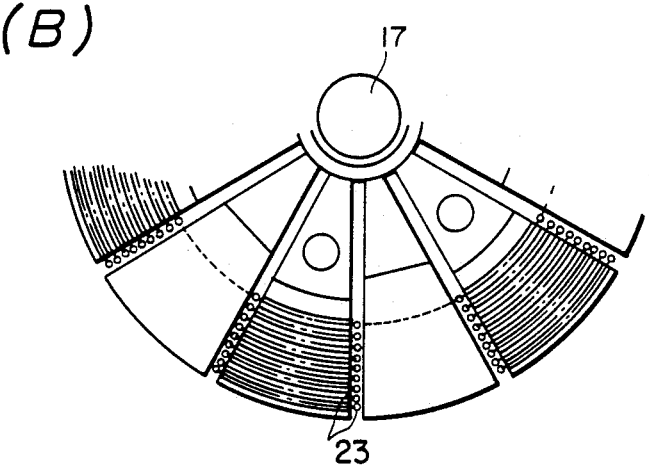

One of the ends of the wire 23 is fixed at a point outside the bobbin 22. The wire supplier 19 is first positioned at the upper side of the wheel 13 in the vicinity of the inner most groove 13d formed in the fin 13b. The rotatable means 17 rotates the bobbin 22 around the axis in the backward direction by a prescribed angle that is substantially equal to the vertical angle $\theta$ of the fin 13b. While, the wire 23 is positioned in the inner most groove of the fin, as shown in FIG. 10, the wire supplier 19 moves downwardly along the axis to approximately the midpoint of the spacer 15 and then stops. The rotatable means 17 rotates the bobbin 22 in a forward direction so that the wire supplier 19 will not collide with the wheel 14 if it moves further downwardly to the outside of the wheel 14. The wire supplier 19 then moves downwardly to the outside of the wheel 14 and stops in the vicinity of the inner most groove formed in the fin 14b. Again, the rotatable means 17 again rotates the bobbin in the backward direction at the same angle as described above. The wire supplier 19 moves upwardly to the mid-point of the spacer 15 and stops. The rotatable means 17 again rotates the bobbin 22 in a forward direction until the wire supplier 19 is clear to continue moving upwardly. The wire supplier 19 moves upwardly towards a position outside the wheel 13 and stops in the vicinity of the inner most groove formed in the fin 13b. The fin 13b near which the wire supplier 19 stops is the fin 13b extending from wheel 13 which is adjacent to the fin 13b from which the wire supplier 19 first started to move in the above description. The rotatable means 17 and the wire supplier 19 repeat the same movement until they return to the first fin 13b. Then, the wire supplier moves sufficiently in the outward direction until the wire 23 aligns with the second groove from the inside which is out from and adjacent to the first inner most groove 13d. The rotatable means 17 and the wire supplier 19 move in the same manner as described above to complete the winding in each groove until all of the nine grooves 13d, 14d of each fin 13b, 14b support a wire 23 from the inner side to the outer side of the slanted ends 13b and 14b.

After the winding of the wire 23 onto the bobbin 22 is finished, the wire 23 wound around the bobbin 22 is positioned with respect to the stator core 6 as follows.

Figure 12:
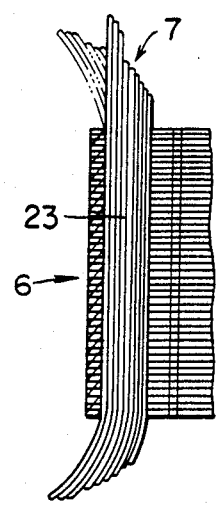
FIG. 12 is an enlarged perspective view of a projecting portion of a stator coil.
Figure 12:
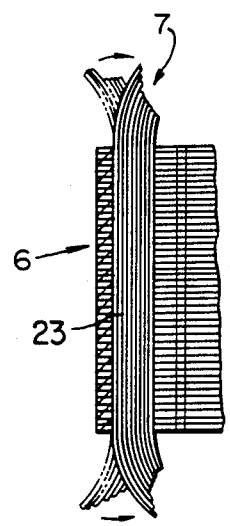

First the bobbin 22, together with the wire 23 wound therearound, is positioned within the stator core 6, taking the place of the rotor core 3 which is to be installed at a later time. The axis of the bobbin 22 and its midpoint along the axis coincide with those of the stator core 6, respectively. At the same time, the rotational angle of the bobbin 22 is adjusted so that the fins 13b and 14b and the supplementary fins 13c and 14c align evenly with the teeth 6a of the inner wall of the stator core 6 so that the gaps 24 become aligned with the grooves 6b. The outer diameter of the bobbin 22 is slightly smaller that the inner diameter of the stator core 66 so that the side faces of the fins 13b and 14b become close to the teeth 6a, as shown in FIG. 11(A). A force is then applied to move the sliders 20, outwardly. The sliders 20 are initially located at the inner side of the wire 23 so that the outward movement forces the wire 23 to slide from the gap 24 and off of the grooves 13d and 14d. The wire 23 is then separated from the bobbin 22 and installed within the aligned grooves 6b formed between the teeth 6a of stator core 6. Despite the fact that the thickness of the wedge shaped fins 13b and 14b (as viewed from above, as shown in FIG. 11) increases as the distance measured from the central axis increases, the wire 23 wound around the bobbin 22 can slide off smoothly because the surface of each fin 13b, 14b where the wire 23 is wound is slanted so that the inner most turn of wire 23 is longer than the outer most turn of the wire 23. The difference in height, measured parallel to the axis, between each of the nine grooves 13d, 14d of each slanted portion of each fin 13b, 14b, respectively, corresponds to the difference in the length of the portion of the wire 23 projecting out of the teeth 6a from the edge of the stator core 6. The relatively large distance between the third and the fourth grooves 13d and 14d (as counted from the inner most groove) corresponds to the slit 11 formed between the inner and outer batches when the bundles are positioned around the teeth 6a. This completes the description of the installation of the first bundle into the stator core 6, as shown in FIG. 12.

Now that the first bundle is installed into the grooves 6b of the stator core 6, the rotatable means 17 and the wire supplier 19 can wind a second bundle. After finishing the winding of the second bundle around the bobbin 22 the second bundle is positioned within the stator core 6 in the same manner as the first bundle, but into the grooves 6b next to the ones in which the first bundle is located. The third bundle is made and positioned in the stator core, similarly, within the remaining open grooves 6b.

From the foregoing it should be readily apparent that the arrangement of the stator coil which, although, sophisticated in a sense, can be achieved by means of the bobbin provided by the invention.

It should also be apparent from the description above that a method for winding the stator coil is not merely restricted to the method employing the bobbin described in the preferred embodiments, but any type of bobbin can be employed as far as it permits the prescribed arrangement of the stator coil, therearound.

Further, it should be noted that the starter coil might be arranged in the prescribed form without any bobbins as the conditions permit.

What is claimed is:

1. An alternating current generator for vehicles comprising a rotor rotatable along a central axis, a stator core positioned along said central axis said rotor, a stator coil disposed within said stator core and having a portion extended parallel to said central axis from said stator core, and a cooling fan attached to said rotor and being generally perpendicular to said central axis so that the cooling air flow generated by said cooling fan flows radially outward towards said extended portion of said stator coil, said extended portion of said stator coil comprising:

a first wire batch composed of wires extended to a first distance from said stator core; and, a second wire batch composed of wires extended to a second greater distance from said stator core so that a space is created between said first and second wire batches through which said cooling air may flow to cool said wire batches of said stator coil.

2. A stator coil disposed within a stator core of an electro-motive device having an internal air cooling system, a central rotor and a rotor coil, said stator core including slots for retaining said stator coil, said stator coil comprising;
- a first wire batch composed of wires extended to a first distance from said stator core;
- a second wire batch composed of wires extended to a second greater distance from said stator core so that a space is created between said first and second wire batches and wherein said first and second wire batches extend out form one of said stator core slots through which said cooling air may flow to cool said wire batches.

3. A stator coil according to claim 2, wherein said first wire batch comprises generally two thirds the total number of wires in both said first and second batches and said second wire batch comprises the remaining one third number of wires.

4. A stator coil according to claim 2, wherein said extended wire of each of said first and second wire batches is arranged side by side so that a curved plane is formed which is substantially parallel to said stator core.

5. A stator core according to claim 2, wherein the difference between said first distance and said second greater distance is substantially equal to twice the diameter of the wire used for said stator coil.

6. A stator coil disposed within a stator core of an electro-motive device having an internal air cooling system, a central rotor and a rotor coil, said stator coil comprising;
- a first wire batch composed of wires extended to a first distance from said stator core; and,
- a second wire batch composed of wires extended to a second greater distance from said stator core so that a space is created between said first and second wire batches through which said cooling air may flow to cool said wire batches, said extended wire of each of said first and second wire batches being arranged side by side so that a curved plane is formed which is substantially parallel to said stator core.

7. A stator coil disposed within a stator core of an electro-motive device having an internal air cooling system, a central rotor and a rotor coil, said stator coil comprising;
- a first wire batch composed of wires extended to a first distance from said stator core; and,
- a second wire batch composed of wires extended to a second greater distance from said stator core so that a space is created between said first and second wire batches through which said cooling air may flow to cool said wire batches, said difference between said first distance and said second greater distance is substantially equal to twice the diameter of the wire used for said stator coil.

8. A stator coil disposed within a stator core of an electro-motive device having an internal air cooling system, a central rotor and a rotor coil, said stator coil comprising;
- a first wire batch composed of wires extended to a first distance from said stator core; and,
- a second wire batch composed of wires extended to a second greater distance from said stator core so that a space is created between said first and second wire batches through which said cooling air may flow to cool said wire batches, said extended wire of each of said first and second wire batches being arranged side by side so that they form a curved plane which is substantially parallel to said stator core, said difference between said first distance and said second greater distance being substantially equal to twice the diameter of the wire used for said stator coil.

9. A stator coil disposed within a stator core of an electro-motive device having an internal air cooling system, a central rotor and a rotor coil, said stator coil comprising;
- a first wire batch composed of wires extended to a first distance from said stator core; and,
- a second wire batch composed of wires extended to a second greater distance from said stator core so that a space is created between said first and second wire batches through which said cooling air may flow to cool said wire batches, said first wire batch comprising generally two thirds the total number of wires in both said first and second batches and said second wire batch comprising the remaining one third number of wires.

10. A stator coil disposed within a stator core of a generator of the type which generates three phase current and includes an internal air cooling system, said stator coil including three bundles of wire corresponding to the three phases of current generated, each of said stator coil bundles comprising;
- a first wire batch composed of wires extended to a first distance from said stator core; and,
- a second wire batch composed of wires extended to a second greater distance from said stator core so that a space is created between said first and second wire batches through which said cooling air may flow to cool said wire batches.

11. A stator coil according to claim 2, wherein said first wire batch is closer to said central rotor than said second wire batch.

* * * * *